(12) United States Patent
Kneckt et al.

(10) Patent No.: US 9,936,443 B2
(45) Date of Patent: Apr. 3, 2018

(54) CONTROLLING DISCOVERABILITY (71) Applicant: Nokia Technologies Oy, Espoo (FI)

(72) Inventors: Jarkko Kneckt, Espoo (FI); Olli Alanen, Vantaa (FI); Mika Kasslin, Espoo (FI); Janne Marin, Espoo (FI); Enrico Henrik Rantala, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 76 days.

(21) Appl. No.: 14/627,303

(22) Filed: Feb. 20, 2015

(65) Prior Publication Data
US 2016/0249280 A1 Aug. 25, 2016

(51) Int. Cl.
*H04W 48/16* (2009.01)
*H04W 48/12* (2009.01)

(52) U.S. Cl.
CPC ............ *H04W 48/16* (2013.01); *H04W 48/12* (2013.01)

(58) Field of Classification Search
CPC ..... H04W 8/005; H04W 48/10; H04W 48/16; H04W 84/12
See application file for complete search history.

(56) References Cited

U.S. PATENT DOCUMENTS

| | | | | |
|---|---|---|---|---|
| 2005/0128988 A1* | 6/2005 | Simpson | ............... | H04W 48/16 370/338 |
| 2007/0064655 A1* | 3/2007 | Ruuska | ................ | H04W 48/16 370/332 |
| 2008/0013462 A1* | 1/2008 | Ye | ........................ | H04L 12/2602 370/252 |
| 2008/0106399 A1* | 5/2008 | Yaqub | ................ | G08B 13/1427 340/539.11 |
| 2009/0274129 A1* | 11/2009 | Ponnuswamy | ....... | H04W 16/08 370/338 |
| 2010/0135267 A1* | 6/2010 | Strutt | ..................... | H04W 48/12 370/338 |
| 2013/0177002 A1 | 7/2013 | Sun et al. | | |
| 2013/0250803 A1* | 9/2013 | Abraham | ................ | H04L 67/16 370/254 |
| 2013/0304918 A1* | 11/2013 | Kneckt | ................. | H04W 48/16 709/225 |
| 2014/0010223 A1* | 1/2014 | Wang | .................... | H04W 48/12 370/338 |
| 2014/0105131 A1* | 4/2014 | Chu | ...................... | H04W 48/16 370/329 |

(Continued)

FOREIGN PATENT DOCUMENTS

WO   WO 2013132135 A1 *   9/2013   ............ H04W 84/12

OTHER PUBLICATIONS

*Winot Proposal Tgu Network Selection Requirements Cluster; 11-06-0073-00-000u-winot-proposal-tgu-network-selection-requirements-cluster* IEEE-SA Mentor, Piscataway, NJ, USA, vol. 802.11u, Jan. 16, 2006, pp. 1-52, XP017687894.

(Continued)

*Primary Examiner* — Scott M Sciacca
(74) *Attorney, Agent, or Firm* — Harrington & Smith (57) ABSTRACT

An apparatus and a method for controlling discoverability are disclosed. The solution includes obtaining information of at least one scan on at least one communication channel and selecting a discovery mode for an access point from at least two different modes on the basis of the information.

22 Claims, 4 Drawing Sheets

(56) References Cited

U.S. PATENT DOCUMENTS

| | | | | |
|---|---|---|---|---|
| 2014/0204850 A1* | 7/2014 | Kim | ...................... | H04L 5/0078 370/329 |
| 2015/0163723 A1* | 6/2015 | Pandey | ................. | H04W 16/10 370/252 |
| 2015/0341853 A1* | 11/2015 | Cho | .................. | H04W 56/0015 370/331 |
| 2016/0007275 A1* | 1/2016 | Park | ....................... | H04W 8/22 455/434 |
| 2016/0128101 A1* | 5/2016 | Park | .................... | H04W 74/085 370/329 |

OTHER PUBLICATIONS

Yunbo Li (Huawei) *FILS Beacon Proposal 11-12-0042-04-00ai-fils-beacon-proposal* IEEE SA Mentor; Piscataway, NJ, USA, vol. 802.11ai, No. 4, Mar. 14, 2012, pp. 1-17, XP068038103.

Mano, H. et al.; "802.11ai—improving WLAN System Performance"; IEEE draft 11-13/1325r4; Nov. 6, 2013; whole document (26 pages).

\* cited by examiner

CONTROLLING DISCOVERABILITY

TECHNICAL FIELD

The invention relates to the field of wireless communications.

BACKGROUND

In wireless communication systems the connection establishment between a terminal device and an access point or base station or another terminal device is an important feature. There are various ways of establishing the connection. For example, a terminal device of a wireless communication system may be configured to scan for available communication channels before initiating a link setup with an access point or another terminal device of a wireless network. The scanning may comprise passive scanning in which the terminal device scans for broadcast messages or active scanning in which the terminal device transmits a scanning request message and receives a response to the scanning request message. The process of a terminal device finding an access point may be called discovery.

BRIEF DESCRIPTION

According to an aspect of the invention, there is provided an apparatus comprising at least one processor and at least one memory including computer program code, the at least one memory and the computer program code configured to, with the at least one processor, cause the apparatus at least to: obtain information of at least one scan on at least one communication channel; select a discovery mode for an access point from at least two different modes on the basis of the information.

According to another aspect of the invention, there is provided a method comprising: obtaining information of at least one scan on at least one communication channel; selecting a discovery mode for an access point from at least two different modes on the basis of the information.

According to another aspect of the invention, there is provided a computer program product embodied on a distribution medium readable by a computer and comprising program instructions which, when loaded into an apparatus, execute the method described above or any other method described in this document.

Embodiments of the invention are defined in dependent claims.

BRIEF DESCRIPTION OF DRAWINGS

Embodiments of the present invention are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
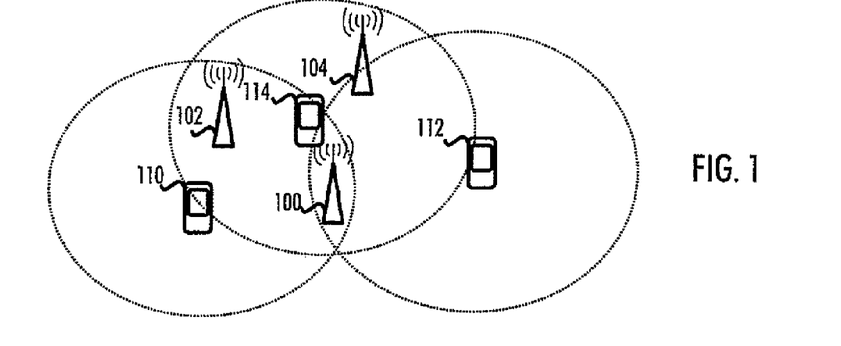
FIG. 1 illustrates an example of a wireless communication scenario to which embodiments of the invention may be applied.

A general wireless communication scenario to which embodiments of the invention may be applied is illustrated in FIG. 1. FIG. 1 illustrates wireless communication devices comprising a plurality of access points (AP) 100, 102, 104 and a plurality of wireless terminal devices (STA) 110, 112, 114. Each base station may be associated with a basic service set (BSS) which is a basic building block of an IEEE 802.11 wireless local area network (WLAN). The most common. BSS type is an infrastructure BSS that includes a single AP together with all STAs associated with the AP. The AP may be a fixed AP or it may be a mobile AP. The APs 100 to 104 may also provide access to other networks, e.g. the Internet. In another embodiment, the BSS may comprise a plurality of APs to form an extended service set (ESS). While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands.

As mentioned above, the transmission band of a BSS contains the primary channel and zero or more secondary channels. The secondary channels may be used to increase data transfer capacity of a transmission opportunity (TXOP).

The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Every device attempting to gain a TXOP is reducing a backoff value while the primary channel is sensed to be idle for a certain time interval, for instance 9 microseconds. When the backoff value reaches zero, the STA gains the TXOP and starts transmission. If another STA gains the TXOP before that, the backoff value computation may be suspended, and the STA continues the backoff computation after the TXOP of the other STA has ended and the primary channel is sensed to be idle. The time duration (the backoff value) may not be decremented during the TXOP of the other STA, but the time duration that already lapsed before the suspension may be maintained, which means that the device now has a higher probability of gaining the TXOP. A secondary channel may be used in the transmission if it has been free for a determined time period (may be the same or different time period than that used for gaining the TXOP) just before TXOP start time in order for the contending device to take the secondary channel in use.

Let us consider an infrastructure BSS that includes an access point together with terminal devices. As mentioned, the access point may be configured to utilize one or more radio channels or frequencies in communication with the terminal devices. The access point is configured to inform terminal devices its presence by transmitting a beacon signal or a beacon frame at predetermined intervals on each channel it uses for communication. The beacon frame comprises information on the access point, its network, and other networks. Typically the predetermined interval is 100 ms. A terminal device may tune to a channel and look for beacon frames. The process is denoted scanning. Upon finding a beacon frame the terminal device may attempt a connection with the access point by transmitting an authentication message. After receiving an authentication response message from the access point, the terminal device and the access point may exchange association messages after which the terminal device is said to be connected to the access point. The association messages may comprise at least one of the following messages: association request, association response, reassociation request, and reassociation response.

If a faster connection set up is desired by the terminal device it may transmit a probe message even if it has not yet received a beacon frame. The probe message may be considered to be an access request. The access point may respond with a probe response. The response message may contain information on the responding device, its network, and other networks. The probe message based method may be denoted active scanning while beacon frame based method is denoted passive scanning.

IEEE 802.11ai task group is creating principles for fast initial link setup (FILS). One aspect of the principles is to enable faster and more precise access point and network discovery. Some principles relate to passive scanning in which a scanning device, e.g. a STA, passively scans channels for any beacon, management, or advertisement frames. The access point may be configured to transmit fast initial link setup or FILS frames at given time intervals between the beacon frames. In an embodiment, the FILS frames are FILS discovery frames. In an embodiment, the FILS frames are sent every 20 ms. The purpose is to reduce the need for active scanning and thus reduce signaling overheads. The terminal devices may be configured to perform passive scanning for 20 ms per a scanned channel prior attempting probe requests. In yet another embodiments, the FILS frames may be sent every 10 ms or every 30 ms, as examples. In yet another embodiment, the FILS frames are transmitted a periodically when at least 10, 20 or 30 ms has elapsed since the beacon, Probe response or FILS Discovery frame that AP has transmitted. When FILS frames are transmitted a periodically, the maximum duration between discovery frames transmission is maintained constant.

When the proposed principles are taken into use, there will be two types of access points and terminal devices deployed, those supporting the proposed principles and legacy devices which are not able to utilize the proposed principles. For example, legacy terminal devices implement one type of discovery mechanism which is designed to discover legacy networks where only beacon frames are utilized in discovery. New types of terminal devices may implement another discovery mechanism which is tailored to discover access points or networks utilizing FILS frames.

In addition, there will be a large number legacy access points deployed. These access points will continue to transmit beacon frames, typically every 100 ms and respond to probe requests. The legacy access points rely that scanning devices will continue to operate in legacy discovery mode, i.e. use longer passive scanning or use active scanning without additional delays.

The power efficiency has been one of the leading design goals in local area networks. It is likely that a large number (in scale of hundreds) of local area networks may be deployed to the cover the same area that is covered typically by a single wide area network. When a lot of networks are deployed, the operating costs of a single network may be reduced as well. One possibility to reduce operating costs is to set the network to power save state and minimize the operations ongoing in the network.

The proposed discoverability mode utilizing FILS frames generates a constant amount of broadcast traffic regardless of the number of terminal devices in the channel. This may consume more transmission resources than legacy scanning mechanism based on beacon frame transmission.

Furthermore, terminal devices supporting proposed discovery mode cannot discover legacy access points as fast and easily as access points utilizing FILS frames.

In an embodiment, a selection mechanism for access points is proposed to select the discoverability mode that they use. In an embodiment, the legacy discoverability mode may be used when the traffic load is small and there are not many terminal devices in proximity. The discoverability mode utilizing FILS frames reduces management frame overheads and may be used in dense deployments, for example.

Figure 2:
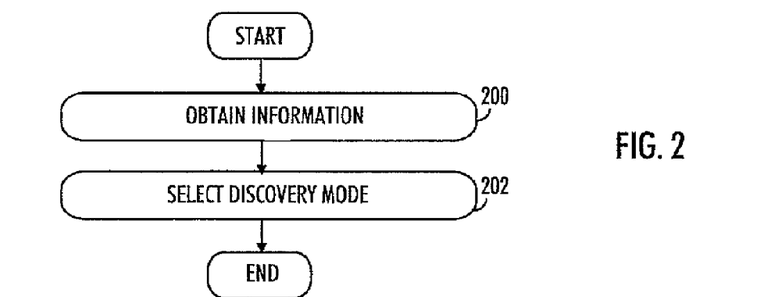
FIG. 2 is a flow chart illustrating an example of an embodiment.

FIG. 2 is a flow chart illustrating an example of an embodiment. The example illustrates the operation of an apparatus. In an embodiment, the apparatus is an access point. In an embodiment, the apparatus is a controller controlling the operation of an access point.

In step 202, the apparatus is configured to obtain information of at least one scan on at least one communication channel. The at least one scan may comprise scanning operation and/or transmission of scanning messages. Beacon frame, probe request frame, probe response frame, and fast initial link setup discovery frame are examples of scanning messages. An access point may scan the communication channel. Alternatively the access point may request an associated STA (or more than one associated STA) perform scanning at a communication channel and report the scanning results back to access point. Beacon Measurement request and report signaling may be used to communicate this request. The access point may report the scan results to a controller.

In step 204, the apparatus is configured select a discovery mode for the access point from at least two different modes on the basis of the information. If the apparatus is the controller, the apparatus may be configured to transmit a message to the access point to apply selected discovery mode.

In an embodiment, a first discovery mode from the at least two different modes comprises sending beacon frames at predetermined time intervals. This corresponds to the legacy discover mode and may be supported by all access points.

In an embodiment, a second discovery mode from the at least two different modes comprises sending beacon frames at predetermined time intervals and sending fast initial link setup frames at given time intervals between the beacon frames. This discovery mode may be available to access points supporting the use of FILS frames.

In an embodiment, the predetermined time interval, in the above embodiments, may be a configured time interval not depending on detected scans or dynamical channel characteristics. In an embodiment, the predetermined time interval may be common for a plurality of wireless networks. In an embodiment, the predetermined time interval may be 100 ms, or 50 ms, as an example.

In an embodiment, a third discovery mode from the at least two different modes comprises decreasing the predetermined time intervals between sending beacon frames or sending unsolicited probe response frames at given time intervals between the beacon frames. This discovery mode may be available to legacy access points as well.

Thus, a legacy access point utilizing the third discovery may emulate an access point supporting FILS frame transmission. The legacy access point transmit these frames at the same rate as the FILS Discovery and Beacon frames are transmitted by access points supporting FILS frame transmission. Thus, a legacy access point may be discovered during the passive scanning of the terminal devices supporting FILS frames.

Figure 3A:
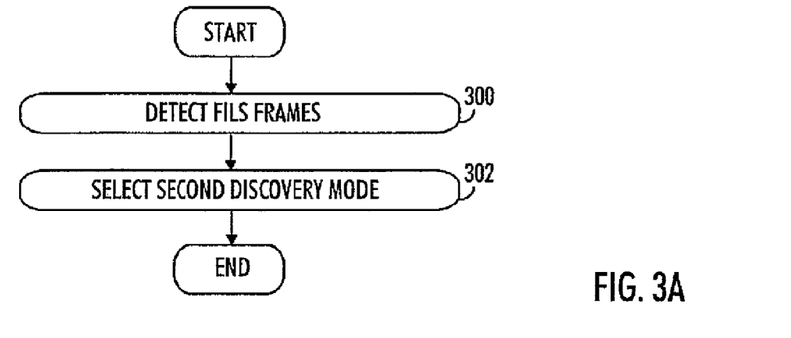
FIGS. 3A, 3B, and 3C are flow charts illustrating examples of some embodiments.
Figure 3B:
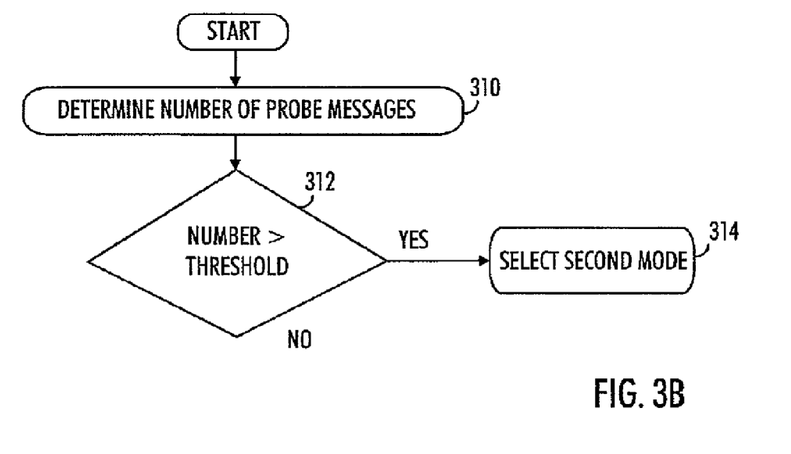
Figure 3C:
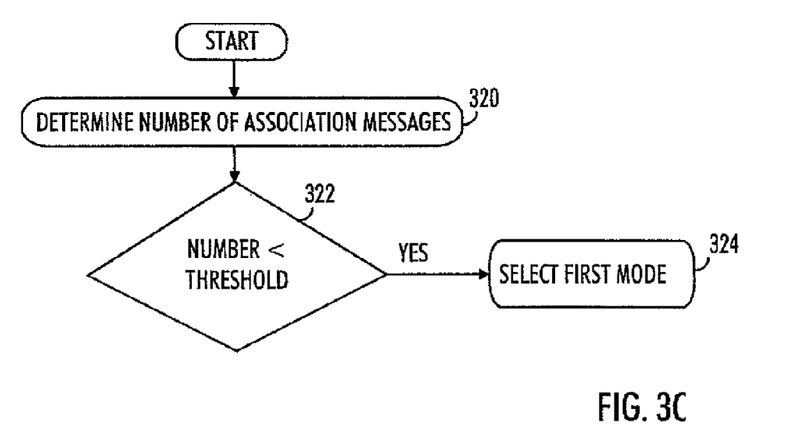

FIGS. 3A to 3C are flow charts illustrating examples of embodiments. The examples illustrate the operation of an apparatus. In an embodiment, the apparatus is an access point supporting the use of FILS frames. In an embodiment, the apparatus is a controller controlling the operation of respective access point. In an embodiment, the any two or three example of FIGS. 3A to 3C may be combined to one embodiment.

Let us study the example embodiment of FIG. 3A. In step 300 of FIG. 3A, the apparatus is configured to obtain information of a scan of at least one communication channel. An access point may scan the communication channel. Alternatively the access point may request an associated STA (or more than one associated STA) to perform scanning at a communication channel and report the scanning results back to access point. The access point may report the scan results to a controller. The scan may indicate that on the communication channel there are FILS discovery frames transmitted from another access point.

In step 302 of FIG. 3A, the apparatus is configured select the second discovery mode for the access point from at least two different modes on the basis of the information. If the apparatus is the controller, the apparatus may be configured to transmit a message to the access point to apply selected discovery mode.

Let us study the example embodiment of FIG. 3B. In step 310 of FIG. 3B, the apparatus is configured to obtain information of a scan of at least one communication channel. An access point may scan the communication channel. Alternatively the access point may request an associated STA (or more than one associated STA) to perform scanning at a communication channel and report the scanning results back to access point. The access point may report the scan results to a controller. The scan may indicate the number of probe messages on the communication channel during a given time interval.

In an embodiment, probe messages may comprise at least one of probe request frames and probe response frames.

In step 312 of FIG. 3B, the apparatus may configured to compare the number of probe messages to a first threshold. In another example, in step 312 of FIG. 3B, the apparatus may configured to compare the number of scanning messages, e.g. FILS frames, to a first threshold.

In step 314 of FIG. 3B, the apparatus is configured to select the second discovery mode if the number of probe messages is above the first threshold.

Let us study the example embodiment of FIG. 3C. In step 320 of FIG. 3C, the apparatus is configured to obtain information of a scan of at least one communication channel. An access point may scan the communication channel. Alternatively the access point may request an associated STA (or more than one associated STA) to perform scanning at a communication channel and report the scanning results back to access point. The access point may report the scan results to a controller. The scan may indicate the number of association messages on the channel during a given time interval.

In step 322 of FIG. 3C, the apparatus is configured to compare the number of association messages to a second threshold.

In step 324 of FIG. 3C, the apparatus is configured to select the first discovery mode if the number of association messages is below the second threshold.

In an embodiment, if none of the criteria in examples 3A to 3C for selecting a discovery mode is fulfilled, the access point is configured to maintain the current discovery mode (whether being the first or second mode).

Figure 4A:
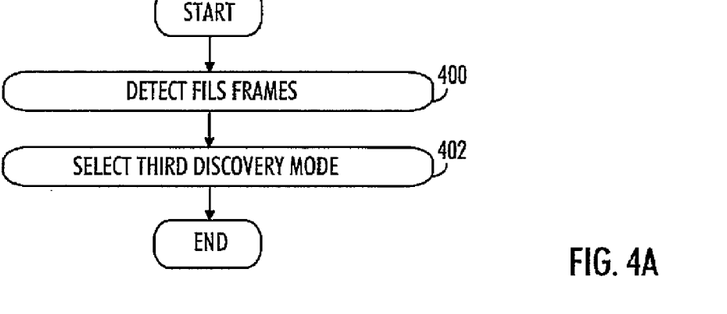
FIGS. 4A, 4B, and 4C are flow charts illustrating further examples of some embodiments.
Figure 4B:
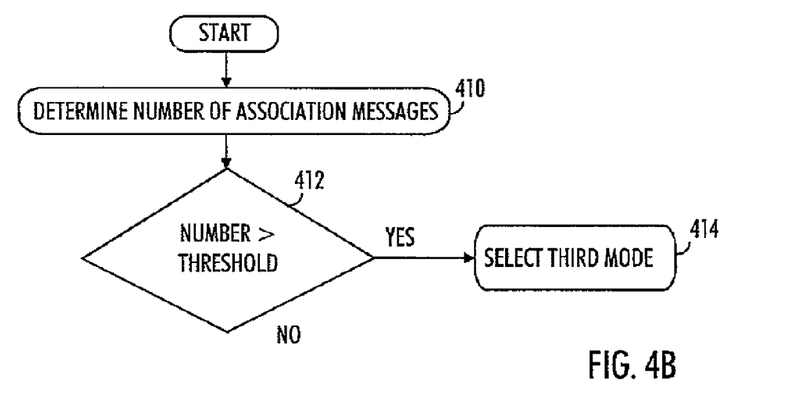
Figure 4C:
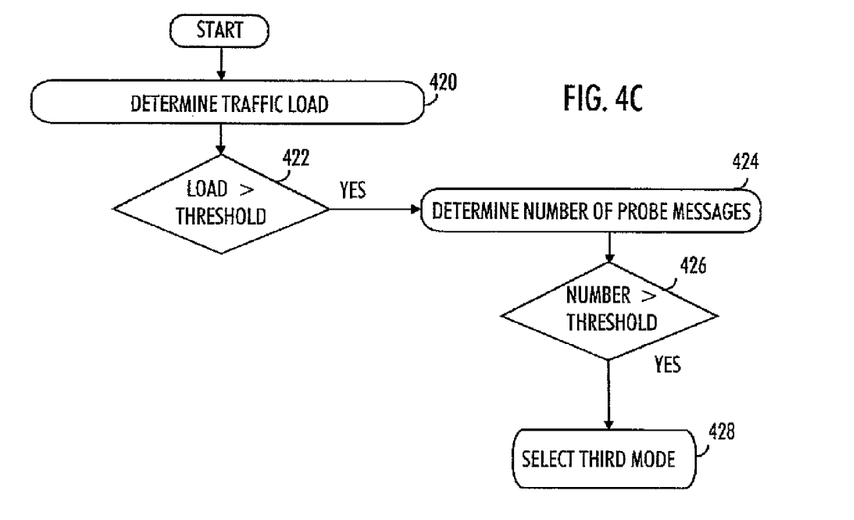

FIGS. 4A to 4C are flow charts illustrating examples of embodiments. The examples illustrate the operation of an apparatus. In an embodiment, the apparatus is a legacy access point not supporting the use of FILS frames. In an embodiment, the apparatus is a controller controlling the operation of respective access point. In an embodiment, the any two or three example of FIGS. 4A to 4C may be combined to one embodiment.

Let us study the example embodiment of FIG. 4A. In step 402 of is FIG. 4A, the apparatus is configured to obtain information of a scan of at least one communication channel. An access point may scan the communication channel. Alternatively the access point may request an associated STA (or more than one associated STA) to perform scanning at a communication channel and report the scanning results back to access point. The access point may report the scan results to a controller. The scan may indicate that on the communication channel there are FILS discovery frames transmitted from another access point.

In step 404 of FIG. 4A, the apparatus is configured to select the third discovery mode on the basis of the detection.

Let us study the example embodiment of FIG. 4B. In step 410 of FIG. 4B, the apparatus is configured to obtain information of a scan of at least one communication channel. An access point may scan the communication channel. The access point may report the scan results to a controller. The scan may indicate that the number of association or authentication messages on the communication channel during a given time interval.

In step 412 of FIG. 4B, the apparatus is configured to compare the amount to a third threshold.

In step 414 of FIG. 4B, the apparatus is configured to select the third discovery mode if the number of association or authentication messages is above the third second threshold.

Let us study the example embodiment of FIG. 4C. In step 420 of FIG. 4C, the apparatus is configured to obtain information of a scan of at least one communication channel. An access point may scan the communication channel. Alternatively the access point may request an associated STA (or more than one associated STA) to perform scanning at a communication channel and report the scanning results back to access point. The access point may report the scan results to a controller. The scan may indicate traffic load on the channel.

In step 422 of FIG. 4C, the apparatus is configured to compare the traffic load on the channel to a fourth threshold.

In step 424 of FIG. 4C, the apparatus is configured to determine on the basis of the scan the number of probe messages on the channel during a given time interval.

In step 426 of FIG. 4C, the apparatus is configured to compare the number to a fifth threshold.

In step 428 of FIG. 4C, the apparatus is configured to select the third discovery mode if the traffic load is above the fourth threshold and the number of probe messages is below the fifth threshold.

In an embodiment, the apparatus may detect detect new clients coming to channel, for instance by detecting a number of MAC addresses in the area. Also in such a case the third discovery mode may be selected.

In an embodiment, if none of the above mentioned criteria for selecting a discovery mode is fulfilled, the access point is configured to maintain the current discovery mode.

In an embodiment, if an access point is operating in third discovery mode but the above mentioned criteria for selecting a discovery mode are not fulfilled for a predetermined time, the first discovery mode, i.e. the legacy mode, may be selected for the access point.

Access points may be connected to a network controller and the network controller may indicate to the access points the discovery mode that is in use. The network controller may determine the suitable discovery mode on the basis of information obtained from the access points as described above. The locations of the access points and the number of terminal devices in the area may be taken into account. The network controller may set only few access points to operate with FILS frame discoverability (or second and third discovery modes). Terminal devices may be directed to other access points through means defined in Multiband Operation, for example.

Figure 5:
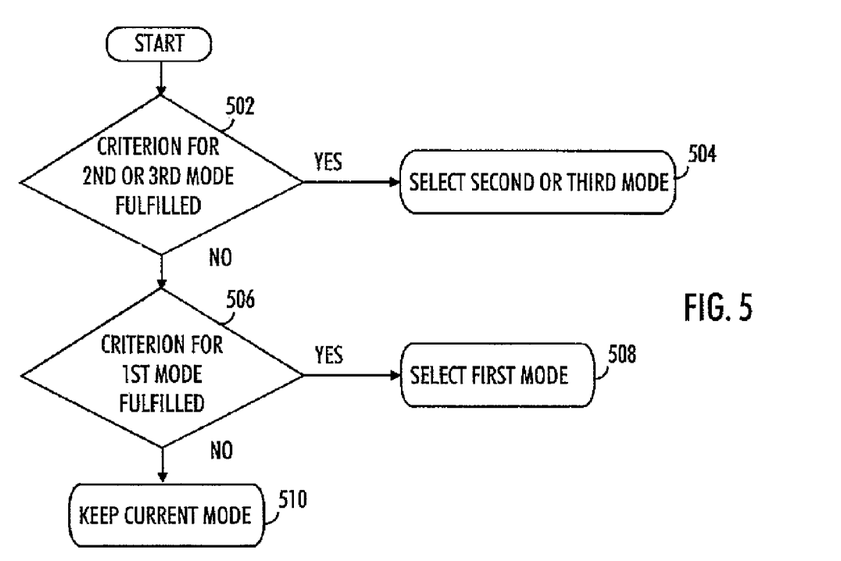
FIG. 5 is a flow chart illustrating an example of an embodiment.

FIG. 5 is a flow chart illustrating an example of an embodiment. The example illustrates the operation of an apparatus. In an embodiment, the apparatus is an access point. In an embodiment, the apparatus is a controller controlling the operation of an access point.

In step 502, the apparatus is configured to determine if at least one of the following criteria is met: the access point detects at least one scanning message transmitted from another access point, the access point detects that a number of probe messages exceeds a first threshold.

If criteria is met, the apparatus is configured to select in step 504 second or third discovery mode depending on which mode is supported.

Otherwise in step 506, the apparatus is configured to determine if the number of association messages is below a second threshold.

If so, the apparatus is configured to select in step 508 the first discovery mode.

Otherwise in step 510, the apparatus is configured to keep the current discovery mode.

In an embodiment, either step 502 or step 506 is optional. In yet another embodiment, an additional criterion may be used to select a mode. The additional criterion may be in addition to step 502 and step 506—or as replacement of step 502 or step 506.

Any of the mentioned thresholds, regarding FIG. 3A, 3B, 3C, 4A, 4B, 4C, or 5, may be prestored value or a value obtained from a network entity, e.g. from an access point. The value may be obtained in a beacon, association response, FILS discovery frame, probe response, as examples.

Figure 6:
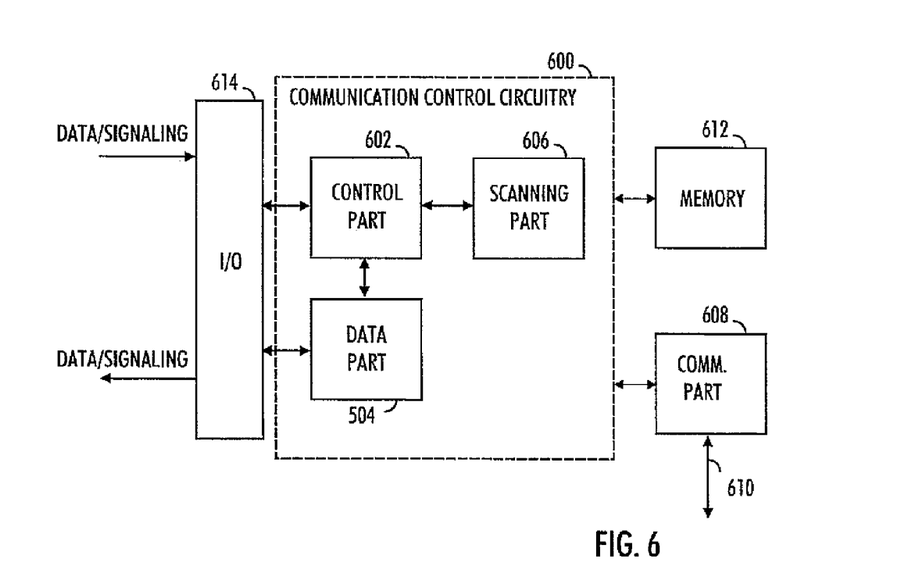
FIGS. 6 and 7 illustrate block diagrams of apparatuses according to some embodiments.

FIG. 6 illustrates an embodiment of an apparatus comprising means for carrying out the above-mentioned functionalities. In an embodiment, the apparatus is an access point or a part of an access point. The apparatus may be a wireless device which complies with specifications of an IEEE 802.11 network or another wireless network. The wireless apparatus may also be a cognitive radio apparatus capable of adapting its operation to a changing radio environment, e.g. to changes in parameters of another system on the same frequency band. The wireless apparatus may be or may be comprised in a computer (PC), a laptop, a tablet computer, a cellular phone, a palm computer, a base station with routing functionalities, or any other apparatus provided with radio communication capability. In an embodiment, the apparatus carrying out the above-described functionalities of the access point is comprised in such a wireless device, e.g. the apparatus may comprise a circuitry, e.g. a chip, a processor, a micro controller, or a combination of such circuitries in the wireless device.

Referring to FIG. 6, the apparatus may comprise a communication controller circuitry 600 configured to control wireless communications in the wireless device. The communication controller circuitry 600 may comprise a control part 602 handling control signalling communication with respect to transmission, reception, and extraction of control or management frames including the beacon frames, fast initial link setup frames, measurement pilot frames, and probe response or scanning response messages, for example. The communication controller circuitry 600 may further comprise a data part 604 that handles transmission and reception of payload data during transmission opportunities of the wireless device (transmission) or transmission opportunities of other wireless devices (reception).

The communication controller circuitry 600 may further comprise a scanning part 606 configured to control the discovery operations. In an embodiment, the control part 602 forwards contents of any scanning request message it has detected, e.g. probe request message, to the scanning part 606. The scanning part may be responsible for generating beacon frames and fast initial link setup frames, for the control part 602. The control part may forward to the scanning part scan results a scan of at least one communication channel. The scanning part configured to select a discovery mode for an access point from at least two different modes on the basis of the scan results. In an embodiment, the communication channel is a wireless local area network channel. In an embodiment, the communication channel is defined by a center frequency and a channel width. In an embodiment, the communication channel has a 20 Mhz channel width. In an embodiment, the communication channel is a primary channel according to IEEE 802.11 specs, e.g. IEEE 802.11-2012.

The apparatus may further comprise a communication part 608 configured to communicate 610 with other network elements such as other access points, network controllers and networks. In an embodiment, the communication part 608 may receive from a network controller a message to adjust discovery mode of an access point.

The circuitries 602 to 606 of the communication controller circuitry 600 may be carried out by the one or more physical circuitries or processors. In practice, the different circuitries may be realized by different computer program modules. Depending on the specifications and the design of the apparatus, the apparatus may comprise some of the circuitries 602 to 606 or all of them.

The apparatus may further comprise the memory 612 that stores computer programs (software) configuring the apparatus to perform the above-described functionalities of the access point. The memory 612 may also store communication parameters and other information needed for the wireless communications within a wireless network of the access point and with other wireless networks.

The apparatus may further comprise radio interface components 614 providing the apparatus with radio communication capabilities within its wireless network and/or with other wireless networks. The radio interface components 614 may comprise standard well-known components such as an amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

Figure 7:
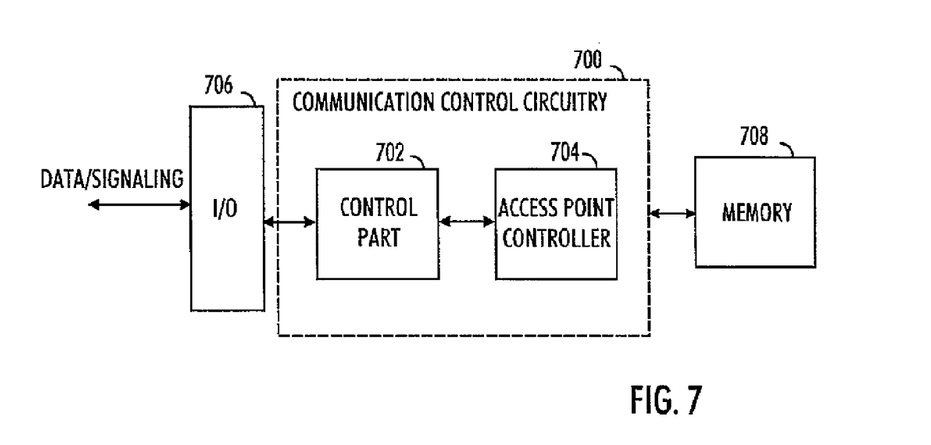

FIG. 7 illustrates another example of an apparatus comprising means for carrying out the above-mentioned functionalities. In an embodiment, the apparatus is a network controller configured to control one or more access points. The access points may be located within the same neighborhood and possibly have at least partially overlapping coverage, for example. The apparatus may be a network component or a network server configured to communicate with wireless devices which comply with specifications of an IEEE 802.11 network or another wireless network. In an embodiment, the apparatus carrying out the above-described functionalities may comprise a circuitry, e.g. a chip, a processor, a micro controller, or a combination of such circuitries.

Referring to FIG. 7, the apparatus may comprise a communication controller circuitry 700 configured to control the communications in the apparatus. The communication controller circuitry 700 may comprise a control part 702 handling control and data communication of the apparatus. The communication may be access points and with other network elements and networks.

The communication controller circuitry 700 may further comprise an access point controller 706 configured to control the discovery operations of the access points. In an embodiment, the control part 702 receives from one or more access points information of a scan of at least one communication channel. The information may be forwarded to the access point controller 704 which may be configured to select a discovery mode for one or more access points from at least two different modes on the basis of the information. The access point controller 704 may be configured to take the locations of the access points and the number of terminal devices in the area into account when determining the discovery mode of the one or more access points. The access point controller network may set only few access points to operate with FILS frame discoverability (or second and third discovery modes).

The access point controller 704 may be configured to transmit messages related to selected discovery mode to the access points via control part 702.

The apparatus may further comprise a communication part 706 configured to communicate with other network elements such as access points, network controllers, network elements and networks.

The circuitries 702, 704 of the communication controller circuitry 700 may be carried out by the one or more physical circuitries or processors. In practice, the different circuitries may be realized by different computer program modules. Depending on the specifications and the design of the apparatus, the apparatus may comprise some of the circuitries 702, 704 or all of them.

The apparatus may further comprise the memory 708 that stores computer programs (software) configuring the apparatus to perform the above-described functionalities of the access point. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in a wireless device comprises at least one processor and at least one memory including a computer program code, wherein the at least one memory and the computer program code are configured, with the at least one processor, to cause the apparatus to carry out the functionalities of the wireless device according to any one of the embodiments of FIGS. 2 to 4C. According to an aspect, when the at least one processor executes the computer program code, the computer program code causes the apparatus to carry out the functionalities of the wireless device according to any one of the embodiments of FIGS. 2 to 4C. According to another embodiment, the apparatus carrying out the embodiments of the invention in the wireless device comprises the at least one processor and at least one memory including a computer program code, wherein the at least one processor and the computer program code perform the at least some of the functionalities of the wireless device according to any one of the embodiments of FIGS. 2 to 4C. Accordingly, the at least one processor, the memory, and the computer program code form processing means for carrying out embodiments of the present invention in the wireless device. According to yet another embodiment, the apparatus carrying out the embodiments of the invention in the wireless device comprises a circuitry including at least one processor and at least one memory including computer program code. When activated, the circuitry causes the apparatus to perform the at least some of the functionalities of the wireless device according to any one of the embodiments of FIGS. 2 to 4C.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in FIGS. 2 to 4C may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the is embodiment. It will be obvious to a person skilled in the art that, as technology advances, the inventive concept can be implemented in various ways. The invention and its embodiments are not limited to the examples described above but may vary within the scope of the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   at least one processor; and
   at least one memory including computer program code, the at least one memory and the computer program code configured to, with the at least one processor, cause the apparatus at least to:
   obtain information that at least one fast initial link setup discovery frame has been received on a communication channel of a wireless network; and
   select a discovery mode for an access point from at least two different discovery modes on the basis of the information, wherein a first discovery mode of the at least two different discovery modes comprises sending beacon frames on the communication channel at predetermined time intervals, and wherein a second discovery mode of the at least two discovery modes comprises sending beacon frames on the communication channel at predetermined time intervals and sending unsolicited scanning messages on the communication channel between the beacon frames.

2. The apparatus of claim 1, the at least one memory and the computer program code configured to, with the at least one processor, cause the apparatus, further to:
   determine from the information an amount of probe messages on the communication channel during a given time interval;
   compare the amount to a first threshold; and
   select the discovery mode on the basis of the comparison.

3. The apparatus of claim 1, the at least one memory and the computer program code configured to, with the at least one processor, cause the apparatus, further to:
   determine from the information an amount of association messages on the communication channel during a given time interval;
   compare the amount to a second threshold; and
   select the discovery mode on the basis of the comparison.

4. The apparatus of claim 1, wherein sending unsolicited scanning messages between the beacon frames comprises at least one of:
   sending fast initial link setup discovery frames at given time intervals between the beacon frames; and
   sending unsolicited probe response frames at given time intervals between the beacon frames.

5. The apparatus of claim 4, the at least one memory and the computer program code configured to, with the at least one processor, cause the apparatus, further to:
   detect transmission of fast initial link setup discovery frames on the communication channel; and
   select the second discovery mode on the basis of the detection.

6. The apparatus of claim 4, the at least one memory and the computer program code configured to, with the at least one processor, cause the apparatus, further to:
   determine a number of probe messages on the communication channel during a given time interval;
   compare the number to a first threshold; and
   select the second discovery mode if the number of probe messages is above the first threshold.

7. The apparatus of claim 1, wherein a third discovery mode from the at least two different modes comprises decreasing the predetermined time intervals between sending beacon frames.

8. The apparatus of claim 1, the at least one memory and the computer program code configured to, with the at least one processor, cause the apparatus, further to:
   determine a number of association messages on the communication channel during a given time interval;
   compare the number to a second threshold; and
   select the first discovery mode if the number of association messages is below the second threshold.

9. The apparatus of claim 1, wherein the apparatus is the access point.

10. The apparatus of claim 1, wherein the at least one fast initial link setup discovery frame has been received by an access point from another access point.

11. The apparatus of claim 1, wherein the apparatus is a controller controlling a plurality of access points.

12. A method comprising:
    obtaining information that at least one fast initial link setup discovery frame has been received on a communication channel of a wireless network; and
    selecting a discovery mode for an access point from at least two different modes on the basis of the information, wherein a first discovery mode of the at least two different discovery modes comprises sending beacon frames on the communication channel at predetermined time intervals, and wherein a second discovery mode of the at least two discovery modes comprises sending beacon frames on the communication channel at predetermined time intervals and sending unsolicited scanning messages on the communication channel between the beacon frames.

13. The method of claim 12, further comprising:
determining from the information a number of probe messages on the communication channel during a given time interval;
comparing the number to a first threshold; and
selecting the discovery mode on the basis of the comparison.

14. The method of claim 12, further comprising:
determining from the information a number of association messages on the communication channel during a given time interval;
comparing the number to a second threshold; and
selecting the discovery mode on the basis of the comparison.

15. The method of claim 12, wherein sending unsolicited scanning messages between the beacon frames comprises at least one of:
sending fast initial link setup discovery frames at given time intervals between the beacon frames; and
sending unsolicited probe response frames at given time intervals between the beacon frames.

16. The method of claim 15, further comprising:
detecting transmission of fast initial link setup discovery frames on the communication channel;
selecting the second discovery mode on the basis of the detection.

17. The method of claim 15, further comprising:
determining a number of probe messages on the communication channel during a given time interval;
comparing the number to a first threshold;
selecting the second discovery mode if the number of probe messages is above the first threshold.

18. The method of claim 12, wherein a third discovery mode from the at least two different modes comprises decreasing the predetermined time intervals between sending beacon frames.

19. The method of claim 12, wherein a first discovery mode from the at least two different modes comprises sending beacon frames at predetermined time intervals or at given times, and the method further comprises:
determining a number of association messages on the communication channel during a given time interval;
comparing the number to a second threshold; and
selecting the first discovery mode if the number of association messages is below the second threshold.

20. A computer program product embodied on a non-transitory distribution medium readable by a computer and comprising program instructions which, when loaded into an apparatus, execute a computer process comprising:
obtaining information that at least one fast initial link setup discovery frame has been received on a communication channel of a wireless network; and
selecting a discovery mode for an access point from at least two different modes on the basis of the information, wherein a first discovery mode of the at least two different discovery modes comprises sending beacon frames on the communication channel at predetermined time intervals, and wherein a second discovery mode of the at least two discovery modes comprises sending beacon frames on the communication channel at predetermined time intervals and sending unsolicited scanning messages on the communication channel between the beacon frames.

21. The computer program product as in claim 20, wherein the computer process further comprises:
determining from the information a number of probe messages on the communication channel during a given time interval;
comparing the number to a first threshold; and
selecting the discovery mode on the basis of the comparison.

22. The computer program product as in claim 20, wherein the computer process further comprises:
determining from the information a number of association messages on the communication channel during a given time interval;
comparing the number to a second threshold; and
selecting the discovery mode on the basis of the comparison.

\* \* \* \* \*